April 26, 1960  N. C. BREMER  2,934,188
IRREVERSIBLE DRIVE
Filed April 1, 1957
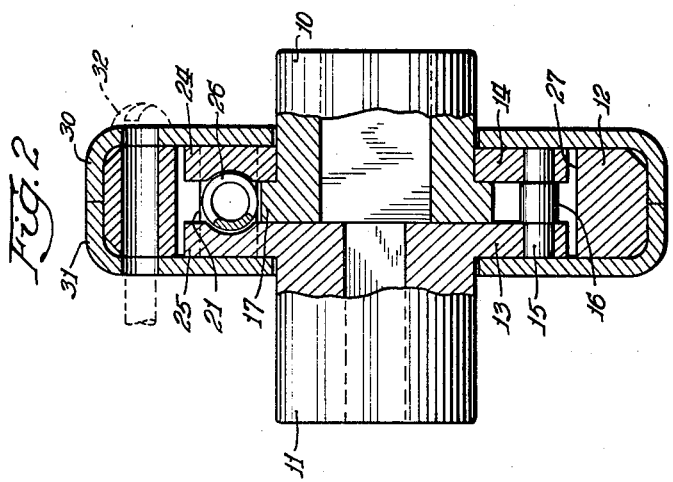
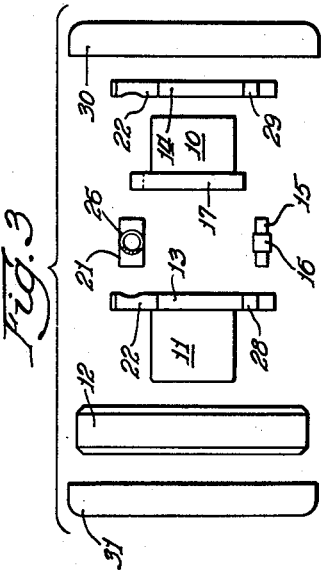
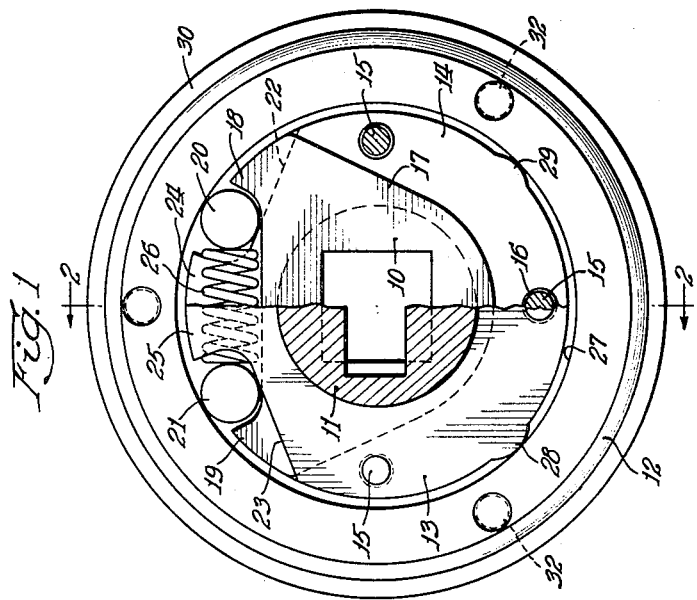
Inventor:
Norman C. Bremer
By: Frank C. Parker
Atty.

United States Patent Office 2,934,188
Patented Apr. 26, 1960

2,934,188

IRREVERSIBLE DRIVE

Norman C. Bremer, Ithaca, N.Y., assignor to Morse Chain Company, Ithaca, N.Y., a corporation of New York Application April 1, 1957, Serial No. 649,891

5 Claims. (Cl. 192—8)

The present invention relates in general to irreversible drive mechanisms comprising combined clutch and brake means and is particularly suited for disposition between the operating crank handle and the conventional ventilating or wing windows of automotive vehicles.

The principal object of the present invention is to provide an improved irreversible drive device comprising a combined clutch and brake mechanism which can be economically manufactured and which lends itself to small size devices which can easily be mounted in the drive line between the operating crank handle and the wing window of an automotive vehicle, for example.

More particularly, it is an object of the present invention to provide an improved irreversible drive device having a relatively substantially cylindrical brake member cooperable with camming devices disposed in operative relation with the driven member and including means for operably disengaging said camming devices from said brake member automatically upon rotation of the drive member associated with the mechanism.

A still further detailed object of the present invention is to provide an irreversible drive device utilizing a driven member having a pair of oppositely inclined cam surfaces which face a cylindrical brake drum, with wedging roller means operatively disposed between the inclined cam surfaces and the brake drum for wedgingly interengaging the driven member with the brake drum so as normally to prevent rotation of the driven member, and further including a driving member having driving projections cooperable with said wedging means to selectively disengage the wedging means from the cam surface upon rotation of the drive member in either direction to thereby automatically complete a drive to the driven member upon rotation of the driving member.

With the foregoing objects in mind, other more detailed objects and advantages of the present invention will become apparent from the following detailed description when read in conjunction with the accompanying drawing, wherein:

Fig. 1 comprises a front elevational view illustrating the irreversible drive mechanism comprising the subject matter of the present invention;

Fig. 2 is a sectional view of the irreversible drive mechanism taken substantially along the line 2—2 in Fig. 1; and Fig. 3 is an exploded view illustrating the different parts which make up the irreversible drive mechanism.

With reference now to the drawing, wherein like reference numerals have been utilized to identify identical parts in different views, the irreversible drive mechanism comprises a drive member 10, a driven member 11 and a brake member 12.

The driven member 11 is formed with a radially outwardly extending flange portion 13 and a member 14 which is similar in configuration to the flange 13 is drivingly interconnected with the flange 13 by means of three connecting pins 15, each of which is provided with a central spacing collar portion 16 for mounting the flange 13 and the member 14 in a substantially fixed axially spaced position with respect to each other.

The drive member 10 is formed with a radially outwardly extending flange portion 17 on the end of the drive member 10 adjacent the flange 13 and this flange portion 17 is formed with a pair of drive projections 18 and 19 cooperable respectively with a pair of wedging rollers 20 and 21. The members 13 and 14 are each provided with a pair of oppositely inclined camming surfaces 22 and 23 which are peripherally spaced from each other by drive projection means 24 and 25 respectively formed on the members 14 and 13.

The rollers 20 and 21 are urged away from each other by means of a compression spring 26 which continuously functions to bias both rollers 20 and 21 into wedging engagement between the camming surfaces 22 and 23 and the inner race 27 formed on brake member 12. This has the effect of locking the driven member 11 to the brake member 12 under normal conditions when the drive member 10 is not rotated.

The members 13 and 14 are each provided with a pair of centralizing bumps 28 and 29 which ride within the interior surface of the brake member 12. A pair of annular housing members 30 and 31 are disposed around the brake member 12, being held together by means of a plurality of bolts 32 and these housing members permit free rotation of the members 13 and 14 therewithin.

When the drive member 10 is rotated in a clockwise direction, as viewed in Fig. 1, the driving projection 19 strikes roller 21 and moves it toward projections 24 and 25 which are secured to the driven member 11 and upon rotation of the driving flange 17 through a sufficient angular distance to cause engagement of the roller 21 with the projections 25 and 24, a positive drive is transmitted through the roller 21 to the driven member 11. Under these conditions the cam surfaces 22 rotate in a clockwise direction with the driven member 11 and thus the roller 20 is moved out of operative wedging engagement with the brake race 27. If the drive member 10 is rotated in a counterclockwise direction, the projection 18 forces the roller 20 against projections 24 and 25 to thereby transmit a drive in a counter-clockwise direction to the driven member 11 and under these conditions the roller 21 is moved out of wedging engagement between cam surfaces 23 and the inner race 27 on brake member 12.

When no rotational force is applied to drive member 10, the compression spring 26 continuously biases the rollers 20 and 21 away from each other and into wedging engagement respectively between cam surfaces 22 and 23 and the surface of the race 27. Upon any tendency of the driven member 11 to rotate in either direction, one or the other of the rollers 20 or 21 is caused to become wedgingly engaged between one of the cam surfaces and the race 27 with increasing force to thereby effectively lock the driven member 11 against rotation. It is therefore apparent that a drive can be transmitted from drive member 10 to driven member 11 in either direction but that it is substantially impossible for the driven member 11 to be rotated relative to the brake member 12 by force applied directly to the driven member 11.

The present irreversible drive device lends itself particularly to those applications where it is necessary to install a small sized mechanism such as is the case when such a mechanism is to be utilized in the driving train between the operating crank handle and the ventilating or wing window of an automotive vehicle.

It is contemplated that changes and modifications may be made in the present invention without departing from the spirit or scope thereof.

What is claimed is:

1. In combination, a brake member adapted to be stationarily mounted, driving and driven members each adapted to be mounted for rotation with respect to said brake member, said brake member including means defining a substantially cylindrical internally facing race, said driven member including driven flange means, means defining cam surface means on said driven flange means and facing said race in different angular directions, means defining driven projection means on said driven flange means, said driven projection means extending substantially radially outwardly between adjacent cam surface means, said driving member including driving flange means disposed adjacent said driven flange means, means defining driving projection means on said driving flange means, each said driving projection means extending substantially radially outwardly from said driving flange means beyond and adjacent one of said cam surface means, wedging means disposed intermediate the respective driving and driven projection means as well as between the respective driving and driven cam means and said race, and resilient means effective to normally bias each wedging means away from the respective driven projection means into wedging engagement between the respective cam surface means and said race thereby holding said driven member against rotation with respect to said brake member, said driving projection means effective to disengage said wedging means from said wedging engagement and urge said wedging means into driving engagement with the respective driven projection means upon rotation of said driving member whereby said driven member is rotated by said driving member.

2. In combination, a brake member adapted to be stationarily mounted, driving and driven members each adapted to be mounted for rotation with respect to said brake member, said brake member including means defining a substantially cylindrical internally facing race, said driven member including at least one driven flange, means defining a pair of cam surfaces on said driven flange and facing said race in different angular directions, means defining a driven projection on said driven flange, said driven projection extending substantially radially outwardly between said cam surfaces, said driving member including a driving flange disposed adjacent said driven flange, means defining a pair of driving projections on said driving flange, each said driving projection extending substantially radially outwardly from said driving flange beyond and adjacent one of said cam surfaces, roller means disposed between each cam surface and said race intermediate the respective driving and driven projection, and resilient means effective to normally bias each roller means away from said driven projection into wedging engagement between the respective cam surface and said race thereby holding said driven member against rotation with respect to said brake member, one of said driving projections effective to disengage the respective roller means from said wedging engagement and urge said roller means into driving engagement with said driven projection upon rotation of said driving member in one direction whereby said driven member is rotated by said driving member, and the other of said driving projections effective to disengage the respective roller means from said wedging engagement and urge said roller means into driving engagement with said driven projection upon rotation of said driving member in the other direction whereby said driven member is rotated by said driving member.

3. In combination, a brake member adapted to be stationarily mounted, driving and driven members each adapted to be mounted for rotation with respect to said brake member, said brake member including means defining a substantially cylindrical internally facing race, said driven member including a pair of like spaced driven flange means, means rigidly interconnecting said driven flange means together in said spaced relation, means defining pairs of like cam surface means on said driven flange means whereby each driven flange means is provided with one cam surface means of each pair thereof, each pair of cam surface means facing said race in a different angular direction, means defining driven projection means on each driven flange means, each driven projection means extending substantially radially outwardly between adjacent cam surface means on the respective driven flange means, said driving member including driving flange means disposed between said driven flange means, means defining driving projection means on said driving flange means, each said driving projection means extending substantially radially outwardly from said driving flange means beyond and between each cam surface means of each pair of cam surface means, wedging means disposed intermediate the respective driving and driven projection means as well as between the respective driving and driven cam means and said race, and resilient means effective to bias each wedging means away from the respective driven projection means into wedging engagement between the respective pair of cam surface means and said race thereby holding said driven member against rotation with respect to said brake member, said driving projection means effective to disengage said wedging means from said wedging engagement and urge said wedging means into driving engagement with the respective driven projection means upon rotation of said driving member whereby said driven member is rotated by said driving member.

4. In combination, a brake member adapted to be stationarily mounted, driving and driven members each adapted to be mounted for rotation with respect to said brake member, said brake member including means defining a substantially cylindrical internally facing race, said driven member including a pair of like spaced driven flanges, means rigidly interconnecting said driven flanges together in said spaced relation, means defining two pairs of like cam surfaces on said driven flanges whereby each driven flange is provided with one cam surface of each pair thereof, each pair of cam surfaces facing said race in a different angular direction, means defining a driven projection on each driven flange, each driven projection extending substantially radially outwardly between adjacent cam surfaces on the respective driven flange, said driving member including a driving flange disposed between said driven flanges, means defining a pair of driving projections on said driving flange, each said driving projection extending substantially radially outwardly from said driving flange beyond and between each cam surface of each pair of cam surfaces, roller means disposed between each pair of cam surfaces and said race intermediate the respective driving and driven projections, and resilient means effective to bias each roller means away from said driven projections into wedging engagement between the respective pair of cam surfaces and said race thereby holding said driven member against rotation with respect to said brake member, one of said driving projections effective to disengage the respective roller means from said wedging engagement and urge said roller means into driving engagement with said driven projections upon rotation of said driven member in one direction whereby said driven member is rotated by said driving member, and the other of said driving projections effective to disengage the respective roller means from said wedging engagement and urge said roller means into driving engagement with said driven projections upon rotation of said driving member in the other direction whereby said driven member is rotated by said driving member.

5. In combination, a brake member adapted to be stationarily mounted, driving and driven members each adapted to be mounted for rotation with respect to said brake member, said brake member including means defining a substantially cylindrical internally facing race, said driven member including a pair of like spaced driven flanges, means rigidly interconnecting said driven flanges together in said spaced relation, means defining two pairs of like cam surfaces on said driven flanges whereby each driven flange is provided with one cam surface of each pair thereof, each pair of cam surfaces facing said race in a different angular direction, means defining a driven projection on each driven flange, each driven projection extending substantially radially outwardly between adjacent cam surfaces on the respective driven flange, said driving member including a driving flange disposed between said driven flanges, means defining a pair of driving projections on said driving flange, each said driving projection extending substantially radially outwardly from said driving flange beyond and between each cam surface of each pair of cam surfaces, roller means disposed between each pair of cam surfaces and said race intermediate the respective driving and driven projections, and a spring disposed between said driven projections and effective to bias each roller means away from said driven projections into wedging engagement between the respective pair of cam surfaces and said race thereby holding said driven member against rotation with respect to said brake member, one of said driving projections effective to disengage the respective roller means from said wedging engagement and urge said roller means into driving engagement with said driven projections upon rotation of said driving member in one direction whereby said driven member is rotated by said driving member, and the other of said driving projections effective to disengage the respective roller means from said wedging engagement and urge said roller means into driving engagement with said driven projections upon rotation of said driving member in the other direction whereby said driven member is rotated by said driving member.

References Cited in the file of this patent

UNITED STATES PATENTS

| | | |
|---|---|---|
| 1,385,785 | Hofer et al. | July 26, 1921 |
| 1,983,284 | Geise | Dec. 4, 1934 |
| 2,258,307 | Vickers | Oct. 7, 1941 |
| 2,493,272 | Spraragen | Jan. 3, 1950 |
| 2,514,465 | Bergsma | July 11, 1950 |
| 2,583,428 | Houplain | Jan. 22, 1952 |
| 2,597,798 | Houplain | May 20, 1952 |
| 2,812,044 | Cole | Nov. 5, 1957 |